Patented Sept. 27, 1949

2,483,131

UNITED STATES PATENT OFFICE 2,483,131

SiF₄-IMPREGNATED SILICA-ALUMINA CATALYST

Allen D. Garrison, Houston, Tex., assignor to Texaco Development Corporation, New York, N. Y., a corporation of Delaware No Drawing. Original application January 23, 1947, Serial No. 723,899. Divided and this application December 31, 1948, Serial No. 68,740

2 Claims. (Cl. 252—441)

This application is a division of my co-pending application Serial No. 723,899, filed January 23, 1947, which in turn is a division of Serial No. 535,551, filed May 13, 1944, upon which Patent No. 2,425,463 issued August 12, 1947.

This invention relates to the catalytic conversion of hydrocarbons, and particularly to the conversion of hydrocarbons at elevated temperatures to produce valuable gasoline hydrocarbons.

The invention contemplates effecting conversion of hydrocarbons by the action of a catalyst comprising or containing alumina which has been treated with anhydrous silicon tetrafluoride. The invention has to do with manufacturing and reactivating catalysts containing alumina.

More specifically, the invention accomplishes (a) a rapid and economical method of manufacturing hydrocarbon conversion catalysts from relatively cheap raw materials, and (b) a new and convenient method for reactivation of such catalysts which have already been in use.

Hydrocarbon conversions of the character anticipated are commonly conducted at such temperatures and pressures that the hydrocarbons are in the vapor state, while the catalysts are solids. The solid catalysts may be either stationary or in motion, but in either case it is desirable for the catalyst to have an extended area in order that the catalyst may be rapidly accessible to the hydrocarbon vapors, and it is essential that the surface of the catalyst shall act to accelerate the formation of the gasoline components and favor the formation of compounds which have desirable properties as fuels. It is common experience that catalysts for such hydrocarbon conversions are more or less limited in their useful life, either by mechanical loss as is commonly encountered in the moving bed technique or by gradual deterioration of the catalytic function with repeated use and regenerations. It is therefore obviously desirable to be able to manufacture suitable catalysts at low cost and to be able to reactivate catalysts wherein the activity has been partly lost by repeated use.

The invention has application particularly to the catalytic cracking of hydrocarbons, although it is contemplated that it may have application to other catalytic conversion processes such as cracking or reforming of naphtha or gasoline hydrocarbons to produce gasoline hydrocarbons of improved characteristics such as increased anti-knock value. The invention may have application to catalytic polymerization and isomerization of olefin hydrocarbons into olefins of more branched chain character.

In accordance with the invention aluminum oxide, preferably alumina with highly developed surface, which normally exhibits low activity and yields gasoline having undesirable properties when used as a catalyst for cracking gas oil, is treated with anhydrous silicon tetrafluoride at a temperature in the range 70 to 950° F. for a short period of time ranging from a few seconds to a few minutes or longer, and as a result is converted into a catalyst of greatly increased activity and desirability. The alumina when in suitable form takes up or reacts with a substantial amount of silicon tetrafluoride amounting to as much as 5% to 15% by weight of the aluminum oxide.

The nature of the activating action of $SiF_4$ is not understood. It may involve physical adsorption or chemical adsorption of silicon tetrafluoride, or chemical reaction between the treating agent and aluminum oxide, or combinations of these phenomena. It is essential for the catalyst to contain at least about 5% and preferably 7% by weight of silicon tetrafluoride in adsorbed or in chemical combination therewith in order to have properly increased activity and yield gasoline having good qualities.

Alumina containing compounds in which the alumina may or may not be present in gel form may be treated in accordance with this invention. Such compounds comprise "activated alumina," dehydrated bauxite, Porocel, and synthetic gel compounds such as silica-alumina complexes, or silica-alumina-zirconia gels containing, for example, about 100 parts by weight of $SiO_2$, 2 parts by weight of $Al_2O_3$, and 5 parts of $ZrO_2$.

It has been proposed heretofore to treat clays and the like with aqueous solutions containing fluorine such as a solution of hydrofluosilicic acid, but such treatments produce hydrated compounds of aluminum and fluorine and involve an etching effect not characteristic of the catalyst of my invention. There are other advantages which will subsequently appear. I have discovered that alumina which is highly adsorptive but of low activity as a cracking catalyst can be transformed into a highly active catalyst by treatment in the substantial absence of water in either liquid or vapor form, with gaseous anhydrous silicon tetrafluoride, which latter by itself apparently exhibits substantially no activity as a cracking catalyst. In addition to having distinct economic advantages, the catalyst so obtained produces different products and exhibits greater activity than one prepared by treating the same type of alumina with an aqueous solution of a fluorine compound such as hydrofluosilicic acid.

Alumina or compositions rich in alumina, when precipitated from water solutions either in nature such as bauxite, or by artificial means as by the addition of bases to aluminum salts or by the addition of acids to the basic aluminates, are invariably hydrated materials. They consist of crystals of sizes depending on the conditions of formation, and have structures which conform to the following names and formulae: boehmite, $\gamma\text{-}Al_2O_3.H_2O$; gibbsite, $\gamma\text{-}Al_2O_3.3H_2O$; diaspore, $\alpha\text{-}Al_2O_3.H_2O$; and bayerite, $\alpha\text{-}Al_2O_3.3H_2O$. In natural bauxite, for example, the hydrated gamma forms of alumina, boehmite, and gibbsite, predominate.

A relatively economical source of almost pure alumina hydrate is available in the modification of the Bayer process. Impure natural alumina is dissolved in hot caustic solution, which eliminates the iron impurities, and is re-precipitated by adding an acid, such as carbonic acid. A hard crystalline form of alumina (bayerite) separates in a scale or crust, is periodically removed with pneumatic drills, and may be crushed, screened and washed almost completely free of impurities.

Since my invention involves an essentially anhydrous reaction between alumina and dry silicon tetrafluoride, it is necessary to remove the water from the hydrated bauxite or alumina almost completely. This removal of water is essential for another reason, namely, that it disrupts the original crystals and produces a form of alumina which has a very much enlarged surface. It is an outstanding feature of my invention that this large surface may be activated and preserved by a method which is rapid and relatively economical.

Alumina having its area thus greatly extended is available on the commercial market as "activated alumina." The activation may be executed by heating, as described in U. S. Patents Nos. 1,868,869 and 2,015,593, and the result is a hard, porous, adsorbent material consisting largely of a form of "gamma alumina" which is not hydrated and some "alpha-monohydrate alumina." Maximum adsorption and maximum area of the solid appear when the water content of the solid has been reduced to about 7% by controlling heating. This is not free water in any sense, but remains combined either as a part of the structure of some of the crystals or as water which is very tenaciously adsorbed (chemsorption) on the most active surface areas. An example of such an activated alumina and one useful in the operation of my invention, is a synthetic alumina material called "Alorco-A" which contains about 92% of $Al_2O_3$, 7% firmly bound water, less than 1% sodium oxide from the caustic which was not completely removed in the washing process and very small traces of silica, iron oxides and titania. The sodium oxide content can be further reduced by washing with very dilute acids or by electrodialysis.

The term "bauxite" is used universally to identify rocks containing certain forms of hydrated alumina as their major constituent. The three recognized forms of alumina are: diaspore or alpha-alumina-monohydrate; boehmite or gamma-alumina-monohydrate; and gibbsite or gamma-alumina-trihydrate. These hydrated materials have relatively large crystals, are not good adsorbents and do not have extended surface areas. They may contain from 12% to 30% of water. In their original state they are thus not suitable for the preparation of the active catalysts by interaction with dry $SiF_4$. However, bauxites may be converted into "activated bauxites" by heating to temperatures in the range 600° F. to 900° F., where almost all of the water is driven off and where the dehydrated alumina develops a large surface area (as much as 290 square meters per gram) and where the adsorptive capacity may attain a maximum. As in the case of the artificial activated alumina, the maximum area appears when the water has been reduced to as low as 7% and where the remaining water is extremely firmly bound. An example of an activated alumina prepared from bauxite, is a material called "Porocel" which is subject to activation with $SiF_4$ according to my invention to yield an active catalytic product, whereas the original "Porocel" is relatively inactive.

Such a material, having its surface area greatly extended and having its adsorptive capacity thus substantially increased by almost complete dehydration under controlled conditions of heating, whether it is derived from natural or artificial hydrated aluminas, will hereinafter be called "dehydrated alumina."

These dehydrated aluminas may have surface areas which are large and other physical properties which adapt them to catalytic functions, but their surface character is such that they do not satisfactorily accelerate the formation of gasoline hydrocarbons, and such hydrocarbons as are formed do not have high value as fuels. My invention provides a rapid, economical and efficient mode of activating the dehydrated alumina so that the desirable physical properties of the alumina are retained, the catalytic efficiency is greatly augmented and the products of the catalytic reaction are rendered more desirable as fuels. These advantages are attained by my process largely by virtue of the fact that the activating agent, silicon tetrafluoride, is a gas. This gas enters the pores of the dehydrated alumina and quickly finds its way into all the inner surfaces where it performs its function of activation immediately and completely. No residue of fluoride need remain unused. This function cannot be performed as quickly or completely by fluorine compounds in solution, since adsorbed air or other gases prevent the complete distribution of the liquid agent into the alumina grains, and since diffusion is very retarded in the liquid state. Furthermore, it is advantageous to retain the hard granular form of the alumina, to avoid etching or weakening of its physical structure, and to preserve the highly developed area which is characteristic of good adsorptive dehydrated alumina. In these respects the invention herein described is a distinct improvement over methods of activation heretofore disclosed.

I have discovered that the speed of the activation reaction is limited only by the time required for the silicon tetrafluoride gas to enter the structure of the alumina and contact the inner surfaces. Any convenient means of accomplishing this is satisfactory. The gas may be simply passed through a bed of the dehydrated alumina granules, or the alumina in granular or powder form may be dropped or otherwise passed through the silicon tetrafluoride gas. I have determined that the presence of other gases which are inert to the fluoride are not detrimental. Dry air, carbon dioxide, flue gas, nitrogen, and various hydrocarbon vapors may be used to dilute the fluoride gas without ill effects. The composition of such mixed gases may vary from a few percent $SiF_4$ to 100%. The optimum amount of silicon tetrafluoride may be admitted to the alumina in an evacuated vessel.

A characteristic property of dehydrated alumina is its great affinity for water. The water becomes attached to the alumina by surface adsorption and the solid structure remains practically intact, there being no tendency to return to the original hydrated aluminas which were present prior to the thermal dehydration. Because of this great affinity for water, it is difficult to handle samples without some slight contact with moist gas and therefore some slight contamination with adsorbed water. I have found, however, that this slight additional adsorbed water is not decidedly harmful in the practice of my invention, although it is better to avoid it. A slight additional amount of silicon tetrafluoride is required to accomplish the activation if such adsorbed water is present, and the activity of the activated catalyst is slightly reduced. For example, the activation of a sample of Alorco-A which has been handled without extreme precautions to avoid a little contamination with water vapor required at least 8.8% $SiF_4$ by weight of alumina to develop optimum activity, whereas a similar sample, which will hereinafter be described more fully, was kept extremely dehydrated prior to activation and found to require only 5.2% $SiF_4$ to produce optimum cracking activity, and gave an exceptionally good yield of gasoline.

An important advantage of my invention is that the activating treatment can be carried out by depositing the dehydrated alumina compound as a stationary bed or mass in a hydrocarbon conversion zone and then merely passing a stream of anhydrous $SiF_4$ through the mass at ordinary temperature and pressure. There are some advantages in employing a temperature of about 70 to 700° F. On the other hand, the treatment can be carried out under substantially the same conditions of temperature and pressure as prevail during the catalytic conversion reaction in which the activated catalyst is to be employed, namely, 700° to 950° F.

Reactivation of used catalysts is also contemplated. Thus, in the case of a fixed catalyst bed type of operation for the cracking of gas oil wherein two or more contact masses are used, hydrocarbons undergoing conversion being passed through one mass while another mass is offstream undergoing regeneration, the fresh catalyst or freshly regenerated catalyst or mixtures of both may be treated in situ with $SiF_4$. This reactivating treatment advantageously follows the regenerating treatment to remove carbonaceous material and precedes reintroduction of feed gas oil vapors to the cracking reaction.

In a "fluidized" catalyst system where the catalyst is used as a dry powder suspended in the gaseous reactants, the stream of powdered catalyst leaving the regenerating zone can be readily subjected to brief contact with a small amount of dry $SiF_4$ for the purpose of maintaining it at a uniformly high level of activity. Likewise, the catalyst in a moving bed type of operation can be continually treated and reactivated.

Accordingly, these reactivating treatments, with $SiF_4$ can be applied to the catalyst either with or without substantially reducing the temperature of the catalyst in the conversion system. A further advantage of the anhydrous gaseous activating and reactivating agent of my invention is that the treatment is applied to the catalyst without subjecting it to wetting, which is impossible without drastic reduction in temperature. This is particularly advantageous in a fluid catalyst system since wetting of the catalyst powder at any temperature interferes with the circulation of the catalyst through the system and with the suspension of the catalyst in the reactant gas.

In the following examples the catalyst in the form of granules or particles of about 8 to 14 mesh was employed as a catalyst to crack virgin mixed-base gas-oil boiling over the range about 500 to 700° F. The catalyst was deposited in a fixed bed reactor, and gas-oil vapors heated to a cracking temperature in the range 800 to 950° F. were passed through the catalyst mass at a space velocity of 2.0 volumes of gas oil measured as liquid at 60° F., per hour, per volume of catalyst. The flow of gas oil vapor through the mass was continued for 2 hours. The total hydrocarbon product obtained over the 2-hour period was fractionated to determine the yield of gasoline having an end boiling point of about 400° F. as percent by weight of gas oil feed. Tests were conducted on the gasoline to establish its desirable character.

$SiF_4$ was prepared by mixing 4 parts of calcium fluoride, 2.3 parts of sand, and 5 parts of concentrated sulfuric acid (98%+) together in a Pyrex glass flask and warming slightly to drive off the $SiF_4$ generated. The $SiF_4$ was freed from HF by passing through silica gel in a drying tower.

*Example 1*

Dehydrated aluminum oxide, Alorco-A, in granular form, 8–14 mesh, was placed in an electrically heated iron vessel and purged with a slow stream of carbon dioxide gas at a temperature of 860° F. for fifteen minutes. Heating was then discontinued, and dry $SiF_4$ gas which contained about 15% dry air was passed into the vessel while slowly rotating to distribute the gas to the solid in a uniform manner. The aluminum oxide adsorbed about 7.9% by weight of $SiF_4$, and at the end of the activation, which required only a few minutes, the temperature had fallen to 680° F. The activated granular catalyst, which had retained its original physical form, was then placed in the cracking reactor, and gas-oil vapor was passed through the reactor at a temperature of 950° F. and under the previously stated conditions of space velocity (2.0) and time (2.0 hr.) thereby obtaining a gasoline yield of 26% by weight based on the gas-oil charge.

*Example 2*

Dehydrated aluminum oxide, Alorco-A, was placed in a Pyrex glass vessel and the vessel evacuated with a vacuum pump. Silicon tetrafluoride which contained approximately 15% dry air was slowly admitted. The starting temperature was about 30° C. (86° F.), and during the activation which evolves some heat, the temperature rose to about 60° C. (140° F.), and the alumina gained 7.15% in weight by reacting with the $SiF_4$. The activation required only about five minutes. When the vessel was opened, it was found that the reaction was complete and no residue of silicon tetrafluoride was left unreacted. The granular form and hardness of the original alumina were preserved, and when the catalyst thus prepared was used at a temperature of 850° F. and under the foregoing conditions of space velocity and time, the gas-oil vapor was converted into gasoline to the extent of 26.5% by weight.

When the dehydrated alumina, Alorco-A, was used in the cracking reaction under the same conditions of space velocity and temperature and using the same gas-oil vapor as in the case of Example 2, and without any activation with SiF$_4$, only 4.1% of the gas-oil vapor was converted into gasoline.

Example 3

Dehydrated alumina, Alorco-A, was placed in the reactor of the catalytic cracking apparatus, its temperature was adjusted to 950° F. and it was then purged with a slow stream of nitrogen for fifteen minutes. Gas-oil vapors preheated to 950° F. together with silicon tetrafluoride were then passed through the catalytic reactor. The space velocity of the gas-oil vapors was the same as that adopted as standard, and the rate of the SiF$_4$ was approximately .014 cu. ft. per minute. At the end of four minutes, the amount of SiF$_4$ gas introduced with the gas-oil amounted to 7.7% of the weight of the alumina, and the fluoride gas was discontinued while the gas-oil vapors were continued through the catalyst for the usual 2-hour period. Thus, the activation of the catalyst by the fluoride gas was conducted in the reaction zone and at the cracking temperature and in the presence of the gas-oil vapors. 26.8% of the gas-oil vapor was converted into gasoline.

Example 4

Dehydrated alumina, Alorco-A, was placed in a glass tube ¾ inch in diameter and 18 inches in length. The alumina was handled in moist air and no special precautions were taken to prevent the adsorption of some small amount of water vapor from the air. A mixture of 10% dry SiF$_4$ and 90% dry nitrogen was passed through the fixed alumina bed at room temperature, (about 30° C.). Since the reaction generates some heat, the progress of the reaction could be followed through the bed by the advance of the heated zone. It is estimated that the temperature rose to 60 to 70° C. in the reaction zone. When the last layer had reacted, it was found that the alumina had absorbed 8.8% of SiF$_4$, and the activating time was 6 to 7 minutes. This activated alumina was then employed as a catalyst for cracking gas oil at 850° F. and under the foregoing conditions of space velocity and time, obtaining a gasoline yield of 24.0%.

Example 5

Aluminum oxide of the same character as used in the preceding example was soaked in acetic anhydride for a period of two weeks continuously to effect complete removal of adsorbed moisture, leaving only that H$_2$O which is an integral part of the solid crystal structure. Thereafter, the acetic anhydride was removed and the dehydrated alumina treated at a temperature of 700° F. with 10% SiF$_4$ and 90% N$_2$ (by volume) until the alumina had absorbed 5.2% by weight of SiF$_4$. The resulting treated catalyst was employed for cracking at a temperature of 850° F. under the foregoing conditions of space velocity and time, obtaining a gasoline yield of 26.6%.

Example 6

A calcined alkali metal-free composite of precipitated silica, alumina ad zirconia in the weight ratio of about 100 SiO$_2$:2 Al$_2$O$_3$:5 ZrO$_2$, without treatment with SiF$_4$ was employed as a cracking catalyst at a temperature of 850° F. under the foregoing conditions of space velocity and time, obtaining a gasoline yield of 25.2%.

Example 7

A sample of the same synthetic gel catalyst used in Example 6 was placed in the reactor of the catalytic cracking apparatus and the temperature adjusted to 850° F. The gas-oil vapors were then introduced into the reactor at the usual cracking rate mixed with SiF$_4$ which was introduced at about .0071 cu. ft. per minute. At the end of 17 minutes the SiF$_4$ was discontinued while the gas-oil vapor was continued over the catalyst for the usual two-hour period. The total SiF$_4$ introduced amounted to 17.5% of the weight of the catalyst although some of the gas passed through unreacted. The gasoline yield was 32.6%.

Example 8

A sample of granular Porocel was dried 3 hours at 500° F., placed under vacuum and cooled to room temperature, and reacted with SiF$_4$ gas at room temperature whereby 4.63% was added to the weight of the alumina. When used as a catalyst to crack gas-oil at 850° F. and at the foregoing space velocity and for the usual two-hour period, a gasoline yield of 21.3% was obtained.

Example 9

A sample of granular Porocel, 4–10 mesh, thoroughly dried by heating 15 hours at 1000° F., was placed in the cracking reactor, and while passing gas-oil at the usual space velocity and at 850° F., SiF$_4$ gas was also introduced with the oil vapors at about .0071 cu. ft. per minute for the first fourteen minutes of the cracking test, after which the SiF$_4$ was discontinued and the oil vapor continued for the usual two-hour period. The SiF$_4$ introduced was about 13.5% of the weight of the alumina although a small amount passed through the alumina unreacted near the end of the 14-minute activating period. The gasoline yield was 22.1%.

Example 10

Dehydrated alumina, Alorco-A, was placed in the reactor of the cracking apparatus and gas oil vapor passed through at the usual space velocity and at 950° F. Activation of the catalyst consisted of passing SiF$_4$ gas along with the oil vapors for the first 12.5 minutes of the cracking test and until SiF$_4$ amounting to 12.3% of the weight of the alumina had entered. The oil vapor was continued for the usual two-hour period. The gasoline yield was 28.6%.

Example 11

Dehydrated alumina, Alorco-A, was placed in the reactor of the cracking apparatus and gas-oil vapor passed through at the usual space velocity and at 900° F. Activation of the catalyst consisted of passing SiF$_4$ gas along with the oil vapors for the first 15 minutes of the cracking test and until SiF$_4$ amounting to 13.7% of the weight of the alumina had entered. The oil vapor was continued for the usual two-hour period. The gasoline yield was 28.6%.

Example 12

Dehydrated alumina, Alorco-A, was placed in the reactor of the cracking apparatus, and gas-oil vapor passed through at the usual space velocity and at 850° F. Activation of the catalyst consisted of passing SiF$_4$ gas along with the oil vapors for the first 15 minutes of the cracking test and until SiF$_4$ amounting to 14.3% of the weight of the alumina had entered. The oil vapor was continued for the usual two-hour period. The gasoline yield was 26.7%.

Example 13

A sample of Alorco-A which normally contains a little less than 1% of sodium oxide was washed repeatedly with 1.0% hydrochloric acid which was free of sodium salts. The sample was then washed repeatedly with distilled water to substantially lower the content of sodium. The sample was then dried at about 100° C. and placed in an electrically heated tube where it was thoroughly dried with a slow stream of nitrogen at a temperature of 700° F. While still maintained at 700° F. a mixture of 10% $SiF_4$ and 90% dry nitrogen (by volume) was slowly circulated through the alumina until the reaction stopped and it was found that 7.1% $SiF_4$ had been absorbed. The alumina thus activated was used in a cracking test in which the gas-oil was passed over the catalyst at the foregoing space velocity and at 850° F. for a two-hour period. The gasoline yield was 25.4%.

Example 14

A sample of Alorco-A was placed in an electrodialysis cell, where it was surrounded by distilled water and exposed to an electric field, so that sodium was rapidly driven out of the alumina granules. After 144 hours of continuous electrodialysis, the sodium impurity of the alumina was reduced to a very small trace. The granular form and physical properties of the alumina were retained. The sample was dried at 100° C. and then further dehydrated by heating to 550° F. for a period of 2 hours. The alumina was then cooled in an evacuated vessel, and $SiF_4$ gas admitted at room temperature until the alumina had gained 7.8% by weight by absorption of the fluoride gas. When used in the catalytic cracking of gas-oil under the foregoing conditions of space velocity and time and at 850° F., a gasoline yield of 26.7% was obtained.

In all of the foregoing examples the activated catalyst was found to have retained the granular form, and the good porosity and mechanical strength which is characteristic of the better grades of dehydrated alumina.

The results obtained in Example 5, when compared with other examples, indicate that a superior catalyst is obtained by treating the aluminum oxide in the absence of any adsorbed water, and also by the use of a smaller amount of $SiF_4$.

Examples 6 and 7 indicate that a synthetic gel type catalyst which contains alumina but has a high content of silica is improved in activity for cracking by treating with $SiF_4$.

While the foregoing examples have to do with catalytic cracking of gas-oil, it is contemplated that the invention has application to the cracking of other hydrocarbon fractions. It has application to the treatment of gasoline and naphtha to effect reforming actions. It also has application to cracking of normally gaseous hydrocarbons at elevated temperatures. In general, the catalyst of this invention may be used for hydrocarbon conversion reactions at temperatures ranging from about 500 to 1000° F.

It may be used for the high temperature treatment of oils derived from other sources such as fatty oils and oxygenated hydrocarbon compounds.

Mention has been made of the catalyst of this invention having an enlarged surface area. By enlarged surface area it is contemplated that the catalyst will have a surface area in excess of 180 square meters and up to 400 square meters per gram of catalyst.

Obviously many modifications and variations of the invention as above set forth may be made without departing from the spirit and scope thereof, and therefore only such limitations should be imposed as are indicated in the appended claims.

I claim:

1. A catalyst effective for converting hydrocarbons at elevated temperatures which consists essentially of a silica-alumina complex containing at least 5% by weight anhydrous $SiF_4$, absorbed at a temperature within a range of about 70° F. to 950° F.

2. A catalyst effective for converting hydrocarbons at elevated temperatures which consists essentially of a calcined alkali metal-free composite of precipitated silica, alumina and zirconia containing at least 5% by weight anhydrous $SiF_4$, absorbed at a temperature within a range of about 70° F. to 950° F.

ALLEN D. GARRISON.

No references cited.